US005689118A

United States Patent [19]

van Beek

[11] Patent Number: 5,689,118

[45] Date of Patent: Nov. 18, 1997

[54] GRID AND METHOD OF MANUFACTURING SUCH GRID

[75] Inventor: Hendrik Frans van Beek, Driebergen, Netherlands

[73] Assignee: Technische Universiteit Delft, Netherlands

[21] Appl. No.: 535,221

[22] PCT Filed: Apr. 15, 1994

[86] PCT No.: PCT/NL94/00078

§ 371 Date: Nov. 16, 1995

§ 102(e) Date: Nov. 16, 1995

[87] PCT Pub. No.: WO94/24676

PCT Pub. Date: Oct. 27, 1994

[30] Foreign Application Priority Data

Apr. 16, 1993 [NL] Netherlands ........................... 9300654

[51] Int. Cl.[6] ................................ G02B 5/00; G21K 1/00

[52] U.S. Cl. ........................................ 250/505.1; 378/149

[58] Field of Search .......................... 250/505.1; 378/149

[56] References Cited

U.S. PATENT DOCUMENTS

| | | | |
|---|---|---|---|
| 3,749,911 | 7/1973 | Hoover et al. | 250/505.1 |
| 4,288,696 | 9/1981 | Albert | 250/505.1 |
| 4,419,585 | 12/1983 | Strauss et al. | 250/505.1 |
| 4,460,832 | 7/1984 | Bigham | 250/505.1 |
| 4,465,540 | 8/1984 | Albert | 250/505.1 |
| 4,951,305 | 8/1990 | Moore et al. | 250/505.1 |
| 5,099,134 | 3/1992 | Hase et al. | 250/505.1 |

*Primary Examiner*—Bruce Anderson

*Attorney, Agent, or Firm*—Michaelson & Wallace; Peter L. Michaelson

[57] ABSTRACT

The invention relates to a slit pattern, to be referred to as grid, comprising a plurality of laminations arranged parallel, which, to form a slit pattern, are maintained in spaced relation by distancing elements, to be referred to as spacers, arranged between the laminations. The invention further relates to a method for the manufacture of such grid.

8 Claims, 4 Drawing Sheets

GRID AND METHOD OF MANUFACTURING SUCH GRID

BACKGROUND OF THE INVENTION

This invention relates to a slit pattern, to be referred to as grid, and a method for the manufacture thereof.

The present grids which are the object of this invention are intended in particular for observing electromagnetic radiation, in particular X-radiation and gamma-radiation, using satellites. A detection device for observing such radiation generally comprises two so-called arrays, each comprising a plurality of grids, and a detection surface made up of radiation detectors. Each grid has a surface area in the range of from 50 mm by 50 mm to 200 mm by 200 mm. An array comprises, for instance, 32 grids, each grid having a different slit width and/or slit direction. The two arrays are identical and are arranged in spaced parallel relationship perpendicularly above each other. A suitable distance between the two arrays is, for instance, 6 m. The radiation is incident on the first array and is transmitted or absorbed depending on the angle of incidence. The transmitted part of the radiation is incident on the second array and there, too, is transmitted or absorbed depending on the angle of incidence. Behind the second array a detection surface with radiation detectors is arranged. The radiation incident on the detection surface provides, upon detection and subsequent signal processing, an image of the source of radiation.

The slit width of the grids in an array should vary from about 4 mm to about 50 μm. For a grid of a slit width of about 50 μm, the distance between the centers of two adjacent slits, to be referred to as pitch, is about 100 μm and the deviation of the slit width should not exceed a few microns. The resolution of the detection device is determined by the grid having the smallest slit width and by the relative distance of the arrays.

In itself it is no problem to manufacture a slit pattern of a slit width of 50 μm and a pitch of 100 μm in thin material. This is simple to realize by means of etching techniques.

However, the problem is that the present grids must have a thickness of at least about 3 mm. The ratio between the height and the width of a slit is therefore at least 60:1. Such a pattern can no longer be manufactured by means of etching technique.

Moreover, the grids must be resistant to the vibrations that occur upon the launching of the satellite in which the grids are disposed and to the large temperature fluctuations that occur when the satellite moves from the sunlight into the shade or vice versa.

A further problem which occurs with the manufacture of grids is that when the thickness of the spacers deviates from the nominal thickness, the desired pitch between the slits is not achieved. However, the spacers can be manufactured in such a manner that the deviation in the thickness of the spacers is very slight. On the other hand, by stacking the spacers, each very slight deviation is successively added to the preceding deviation. Thus, stacking a large number of spacers which themselves are manufactured with an accurate thickness still leads to an unacceptable positional deviation through cumulation of the deviations in the thickness of the spacers.

SUMMARY OF THE INVENTION

The object of the present invention is to provide a grid which satisfies the above stated requirements and with which the problems of the prior art are solved.

A grid thus built up offers the advantage that the separate parts thereof, such as the laminations and the spacers, can be manufactured in a highly accurate manner at relatively slight cost and that after assembly, which in essence does not amount to more than stacking the separate spacers onto each other with interposition of the separate laminations, a grid is obtained which satisfies the stated requirements. The presence of the guides provides the advantage that the laminations are distanced by spacers at several points along their length, so that the chances of the laminations bending relative to each other, which would disturb the slit pattern, are reduced to a minimum.

Because of the guides with the reference faces the laminations are not only distanced by spacers at several points along their length but also accurately positioned by the reference faces provided on the guides, so that any bending of the laminations, not only with respect to each other but also with respect to the nominally desired positions, is prevented. Moreover, a grid with guides of such design offers the advantage that the positional error resulting from cumulation of thickness deviations of the spacers per package of spacers included between two reference faces is reduced to zero. A positional error can only occur within a package due to deviations in the thickness of the spacers within the package. However, because of the limited number of spacers within a package, the positional error remains within the specified margins. Still another advantage of the use of guides provided with reference faces is that the thermal expansion or shrinkage of the grid in the direction perpendicular to the main surfaces of the laminations is exclusively determined by the coefficient of thermal expansion of the guides. Such expansion can be kept small by a suitable choice of the material of the guides.

In order to allow the laminations to freely expand and shrink in longitudinal direction, which is of importance with a view to maintaining the accuracy of the grid when it is exposed to temperature fluctuations, the grid is characterized, in accordance with a further elaboration of the invention, in that the spacers have a thickness substantially corresponding with the desired pitch of the slits, the spacers being of reduced thickness over a part of their surface, so that, upon stacking of the spacers, between two consecutive spacers an opening is present in which a lamination is slidably receivable.

Moreover, a grid with thus designed spacers has the advantage that the pitch of the slits is exclusively determined by the thickness of the spacers, whereas the pitch of the slits of a grid which has been formed by alternately stacking laminations and spacers is additionally determined by the thickness of the laminations. Compared with a grid which has been formed by alternately stacking laminations and spacers, the grid designed with spacers which are of reduced thickness over a part of their surface has half the number of pitch determining contact surfaces. Through the reduction of the number of contact surfaces, the possibility of the occurrence of positional deviations of the laminations is reduced by half.

In order to provide a stable stacking of the spacers, it is particularly advantageous if, in accordance with a further elaboration of the invention, the guides and the spacers are so designed that each spacer is secured by a guide against displacements at least in directions parallel to the main surfaces of the laminations.

A thus designed grid provides for stable stacking of spacers.

A problem encountered when a package made up of a limited number of spacers is included between two reference faces is that as a result of the inaccuracy in the thickness of the spacers in the package, the space between two reference faces is just too large or just too small for the number of spacers to be accommodated. If the space is too large, this gives rise to play between the spacers, which adversely affects the accuracy of the grid. If the space between the reference faces is too small, one spacer must be omitted from the package of spacers, which in turn leads to too large a space between the reference faces for the associated package of spacers, with the above-mentioned disadvantages.

In order to remove these problems, the grid is characterized, in accordance with a further elaboration of the invention, in that the spacers are so designed that a plurality of spacers stacked to form a package are compressible against spring force.

A package which is formed by spacers of such design can be clamped between two reference faces without play. Moreover, the position of the laminations of the compressible package, for each lamination present in the package, is related to the reference face and through the compression a positional error built up through cumulation of the deviations in thickness of spacers is evenly distributed over the laminations disposed in the package.

It is particularly advantageous if, in accordance with a further elaboration of the invention, the reference faces of the guides face each other in pairs and that a package of spacers which has a high spring constant is located between facing reference faces, the spacers of such rigid package that are located on the outsides being in abutment, with or without interposition of a support plate, against the facing reference faces, while a package of spacers having a lower spring constant is clamped between two rigid packages.

A grid of such design offers the advantage that the outermost spacers of the rigid package are pressed against the reference faces or against the support plate located on the reference face with a relatively great force, so that these spacers are located in the proper and desired position. The outermost spacers of the weak package, which is clamped between two rigid packages, are likewise located in the desired position because they are in abutment, with or without interposition of an intermediate element, against the outermost spacers of the rigid package. The weak package is more inclined to compress than the rigid packages bounding the weak package, so that the outermost spacers of rigid packages retain the position related to the reference faces and thereby the outermost spacers of the weak package also acquire a desired position. The intermediate element may for instance be a spacer which has been shortened to leave free space for the support plate located against the reference face.

The invention further relates to a method for the manufacture of a slit pattern, to be referred to as grid, at least comprising distancing elements, to be referred to as spacers, and laminations.

In the method according to the invention, the spacers are manufactured by means of a photochemical etching process from sheet material having a thickness corresponding with the desired pitch of the grid, the grid being assembled by alternately stacking the laminations and the spacers.

Manufacturing the spacers by means of etching provides the possibility of dimensioning the spacers with great accuracy.

In order to reduce the thickness of a part of the surface of the spacers, the photochemical etching process is carried out in two steps, wherein in a first step the photolayer on the sheet material is exposed in such a manner that after exposure in the first etching step the material around the outer contours of the spacers, except for a few points of attachment, is removed, and wherein in a second step the photolayer on the sheet material is exposed in such a manner that after exposure in the second etching step a part of the surface of the spacers is removed, so that the thickness of the spacers at the location of the parts exposed in the second step is reduced.

It will be clear that, in the removal of only a layer of sheet material for the reduction of the thickness thereof, the concentration of the etching fluid and the duration of the etching operations must be selected with great precision.

BRIEF DESCRIPTION OF THE DRAWINGS

To clarify the invention, one exemplary embodiment of a grid and a method for the manufacture thereof will be described with reference to the drawing.

DETAILED DESCRIPTION

Figure 1:
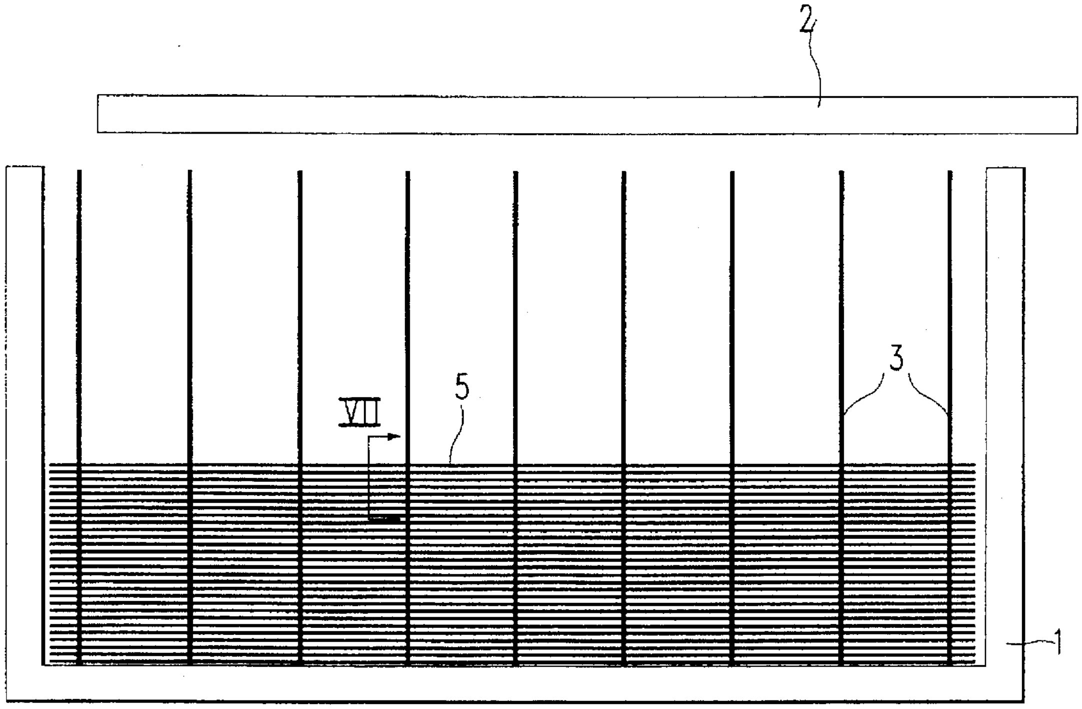
FIG. 1 is a front elevation of an exemplary embodiment of the grid according to the invention.
Figure 2:
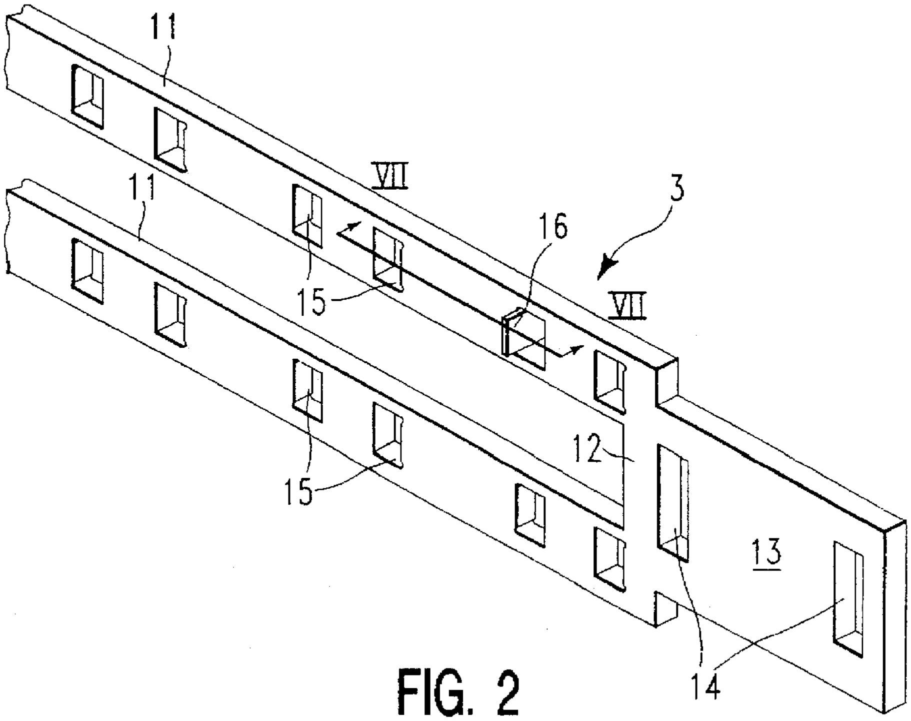
FIG. 2 is a perspective view of a guide.

The exemplary embodiment shown in the drawing comprises a frame made up of a U-shaped part 1 and a closing beam 2. The frame further comprises a plurality of guides 3 over which spacers 4 (FIGS. 3, 4, 5) can be fitted. The spacers 4 keep laminations 5 spaced. The representation of the grid shown in FIG. 1 is approximately full-size, with the proviso that the distance between the laminations 5 is depicted to an enlarged scale for drawing-technical reasons. In the present exemplary embodiment, the real distance between the laminations is 50 μm.

Figure 3:
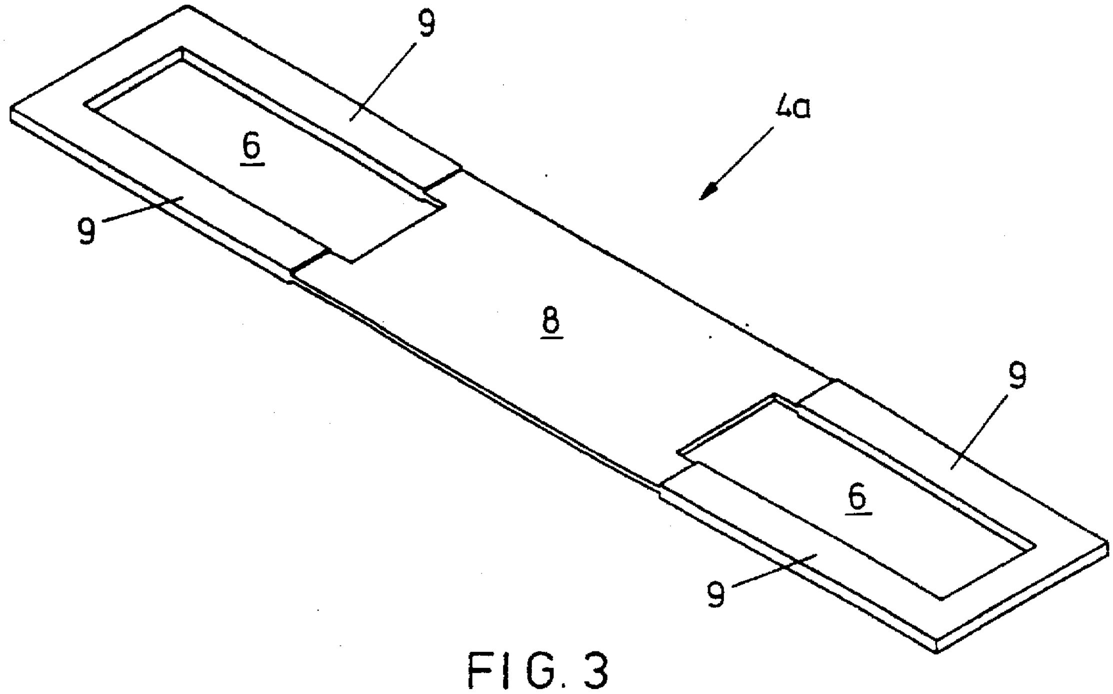
FIG. 3 is a perspective view of a non-resilient spacer.
Figure 4:
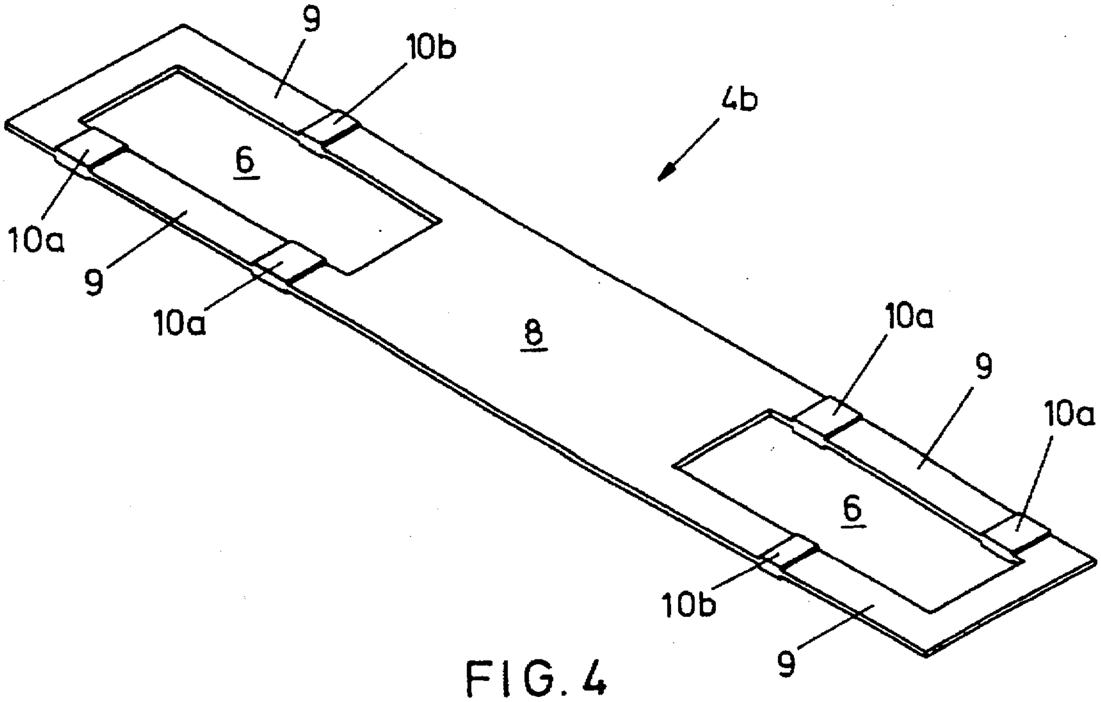
FIG. 4 is a perspective view of a resilient spacer having a relatively high spring constant.
Figure 5:
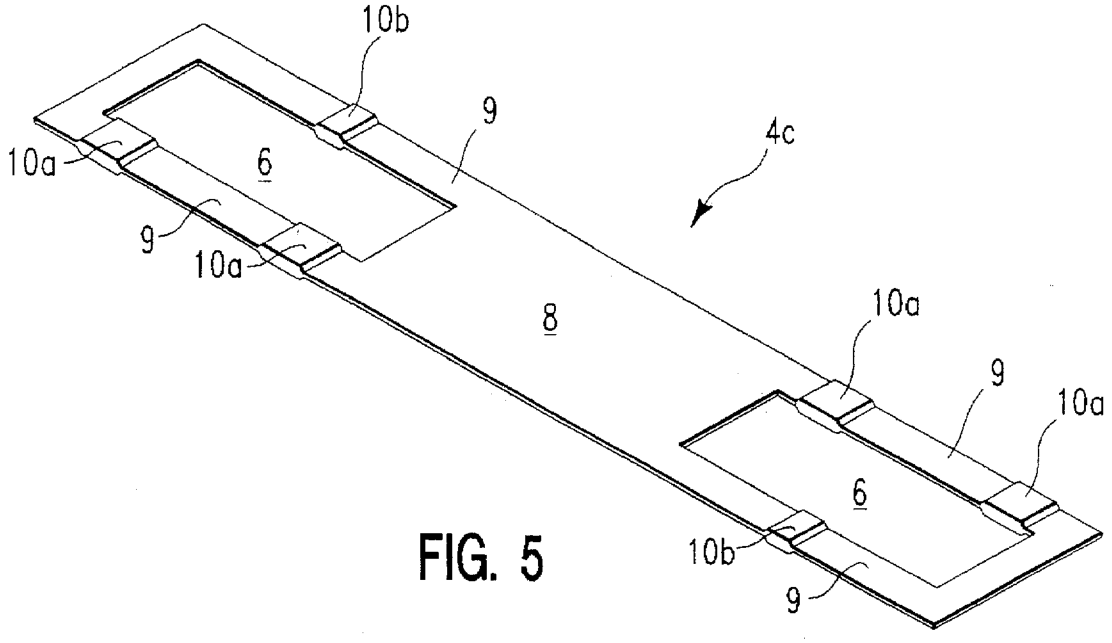
FIG. 5 is a perspective view of a resilient spacer having a relatively low spring constant.
Figure 7:
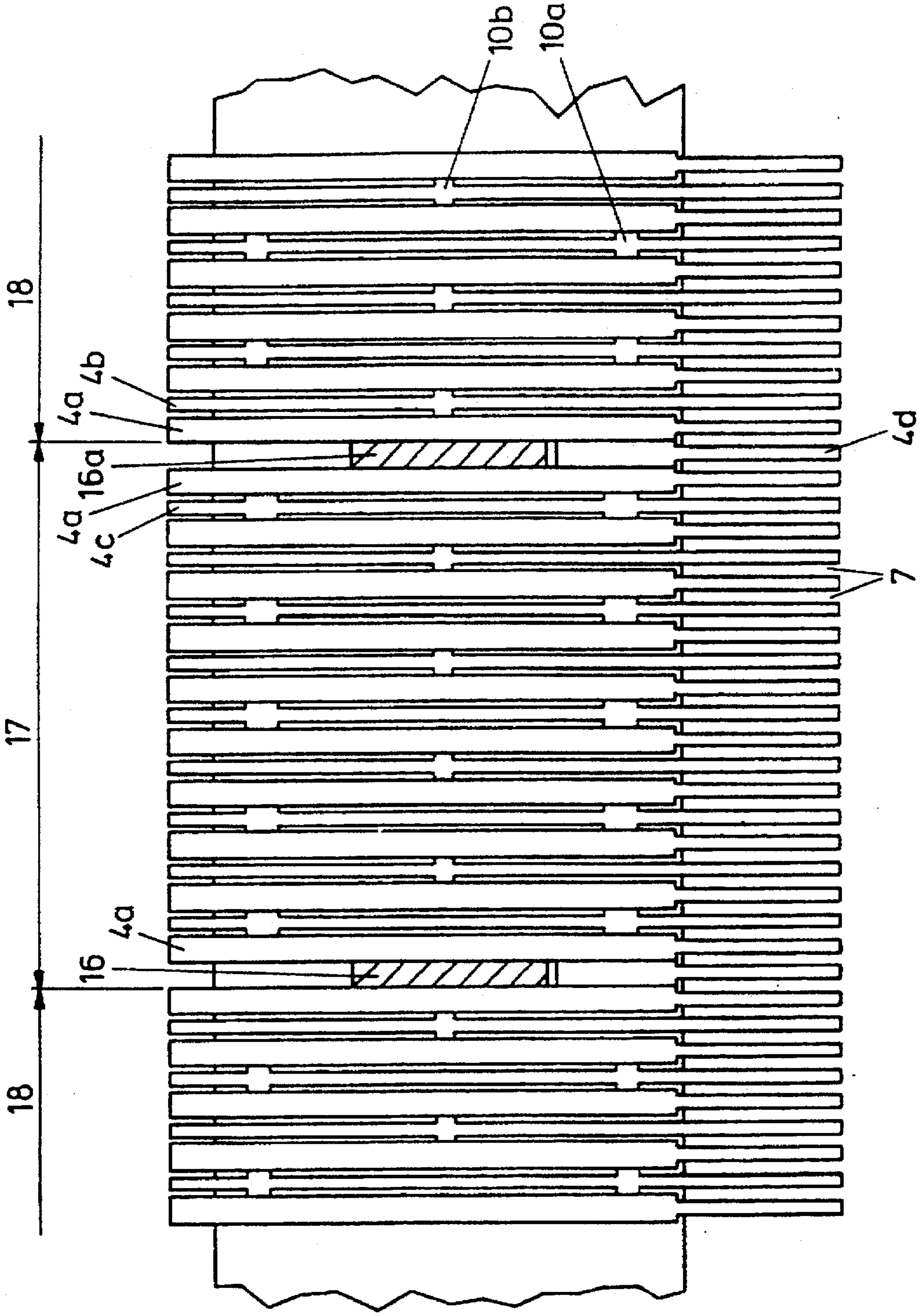
FIG. 7 an enlarged view of a part of the sectional elevation taken on line VII—VII in FIGS. 1, 2 and 6.

As shown in FIGS. 3–5, the spacers **4*a*, 4*b*, 4*c* are rectangular and provided with two apertures 6 near their short sides. The spacers 4*a*, 4*b*, 4*c* have a thickness corresponding with the desired pitch of the slits. The pitch of the slits is defined by the distance between the centers of two adjacent slits. A central portion 8, between the two apertures 6, of the surface of the spacers 4*a*, 4*b*, 4*c* has been removed by means of a photochemical etching process in order to reduce the thickness of the spacers 4*a*, 4*b*, 4*c* in the central portion 8. Accordingly, when the spacers 4*a*, 4*b*, 4*c* are stacked, openings 7 (see FIG. 7) are formed at the central portions 8 of reduced thickness, the laminations 5 being slidably receivable in these openings 7. The central portions 8 of the spacers 4*a*, 4*b*, 4*c* form a supporting surface for the laminations 5. The spacer 4*a* shown in FIG. 3 has its original thickness at the surfaces 9 bounding the aperture 6, so that a collection of spacers 4*a* of this type, stacked to form a package, is not compressible. The surfaces 9 bounding the apertures 6 of the spacers 4*b*, 4*c* shown in FIGS. 4 and 5 have partly been rendered thinner. The thinner portions have been provided in such a manner that the surfaces 9 bounding the longitudinal edges of the aperture 6 comprise two thickened walls 10*a* on one side of the aperture 6 and one thickened wall 10*b* on the other side. In the case of the surface 9 bounding the aperture 6 and comprising the single wall 10***b*, the wall 10*b* is provided centrally of the longitudinal edge of the aperture 6. In the case of the surface 9 bounding the aperture 6 and comprising two walls 10*a*, the walls 10*a* are arranged near the ends of the longitudinal edge of the aperture 6. A package composed of spacers alternately of the type shown in FIG. 3 and FIGS. 4 or 5, with the spacers 4*b*, 4*c* of the type shown in FIGS. 4 or 5 being stacked in such a manner that opposite a wall 10 a reduced surface portion of the next resilient spacer is located, is compressible against spring force. The width of the walls 10 determines the spring constant of a package of spacers 4*b*, 4*c*. According as the walls 10 are wider, the rigidity of the package increases. FIG. 7 clearly shows in what way the spacers 4*a*, 4*b*, or 4*c* have been stacked to form a package. FIG. 4 shows a spacer with narrow walls 10 and FIG. 5 shows a spacer with wider walls 10.

Figure 6:
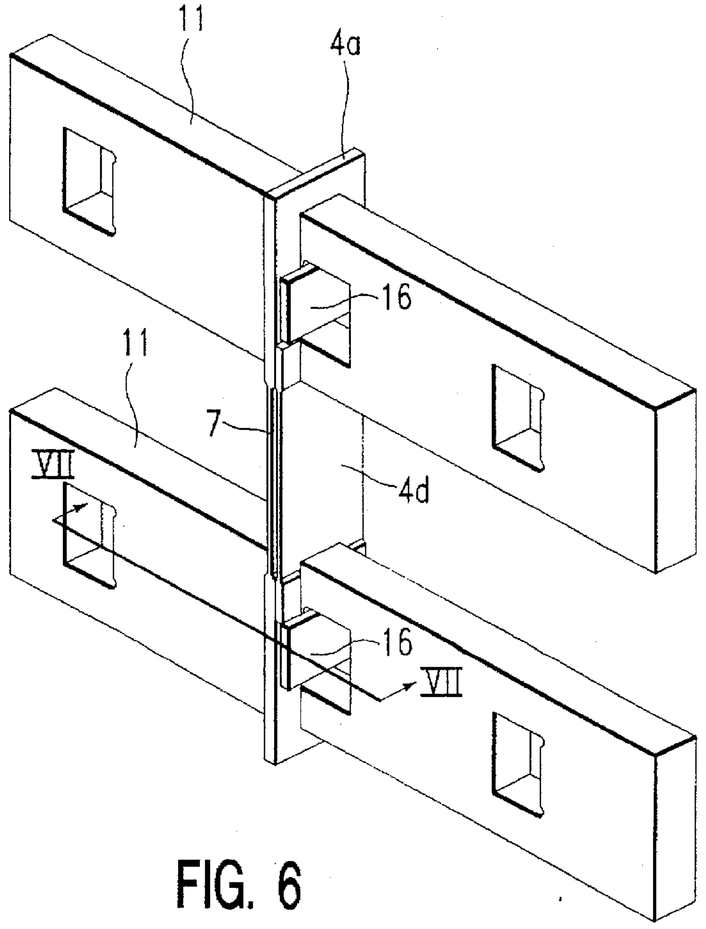
FIG. 6 is a perspective view of the way in which spacers are stacked around a reference face of a guide.

The guides 3 are substantially U-shaped. The legs 11 of the guides 3 have such dimensions and are positioned in such a manner that they correspond with the apertures 6 in the spacers 4*a*, 4*b*, 4*c*. Accordingly, the spacers 4*a*, 4*b*, 4*c* can be fitted over the guides 3 and thus be stacked. The laminations 5 extend between the legs 11 of a guide 3, perpendicularly to this guide 3. The base 12 of the guide 3 comprises a foot 13, which fits into a socket (not shown) provided in the base la of the U-shaped frame 1. In the exemplary embodiment shown, the foot 13 is provided with two parallel slots 14 in which two parallel leaf springs (not shown) are receivable, which leaf springs are connected adjacent the socket with the base la of the U-shaped frame 1. The leaf springs serve for positioning the guides 3 in the longitudinal direction thereof. After being positioned in the frame 1, the guides 3 can be fixed by means of a securing nut (not shown) or by means of lacquer. The positioning of the guides 3 in their longitudinal direction is of great importance since the guides 3 are provided with a plurality of apertures 13 evenly spaced apart in the legs 11, in which apertures 13 one reference face 15 is provided, extending perpendicularly to the longitudinal direction of the guides 3. The reference faces 15 face each other in pairs. In the assembled condition of the grid, a support plate 16 abuts against each reference face 15, the support plate 16 projecting outside the guide 3 on opposite sides thereof. The parts of the support plate 16 projecting outside the guide 3 serve as an abutting surface for a spacer. Located between two pairwise facing reference faces 15 is a package of spacers 17 having a high spring constant. The outermost spacers 4*a* of the rigid package of spacers 17 each abut against a support plate 16 and 16*a*, respectively, which, in turn, each abut against the facing reference faces 15. The package of spacers 17 having the high spring constant presses the support plates 16, 16*a* with force against the reference faces 15. Since the thickness of the support plates 16, 16*a* is accurately defined, the outermost spacers of the rigid package 17 are located in the desired positions. Positional deviations of laminations 5 due to accumulation of thickness deviations of the spacers 4 can now only occur within the package 17. When the package 17 comprises no more than 50, and preferably no more than 35 spacers, the positional deviations within the package remain within the tolerance limits. Preferably, the thickness of the support plate 16 corresponds with the thickness of the spacers 4. At the location of the support plate 16, a short spacer 4*d* (see FIGS. 6 and 7) can be included to fill up the gap produced by the support plate 16. Between two rigid packages 17, a package of spacers 18 having a lower spring constant is included, the outermost spacers 4*a* thereof resting against the short spacer 4*d* and the side of the support plate 16 proximal to the reference face 15. Because the rigid package 17 presses the support plate 16 against the reference face 15 with more force than the force with which the weak package 18 presses the support plate 16 off the reference face 15, the positions of the outermost spacers 4*a* of both the rigid package of spacers 17 and the weak package of spacers 18 are accurately related to the reference face 15.

The spacers 4*a*, 4*b*, 4*c*, 4*d* are manufactured by means of photochemical etching. The manufacture takes place in two exposure and two etching steps, a stainless steel sheet of a thickness of 100 μm being used as starting material. The stainless steel sheet is treated with photoresist. In the first exposure step, the lacquer around the outer contours of the spacers, except for some points of attachment, is exposed. In the first etching step the material which has been exposed, apart from the unexposed points of attachment, is removed completely by etching. After the first etching step, the spacers 4 are connected with the stainless steel sheet only through the points of attachment. In a second exposure step, parts 8, 9 of the surface of the spacers 4 are exposed. Then in the second etching step, the exposed parts 8, 9 are partly removed by etching, so that the spacers 4 acquire a lesser thickness on these surface portions. The laminations 5 of the grid may for instance be manufactured from rolled-flat tungsten wire. Such laminations 5 have a good surface quality, a very constant thickness and exhibit no burrs or any other detrimental unevennesses. The frame 1 and the guides 3 may be manufactured from, for instance, an iron-nickel-cobalt alloy by means of spark erosion.

After the guides 3 have been placed in the frame 1 and accurately positioned in the longitudinal direction, the spacers 4 and laminations 5 can be assembled by stacking them alternately. Positioning of the spacers 4 and the laminations 5 is effected by fitting the support plates 16. Finally, a closing beam 2 is placed on the U-shaped frame 1, whereafter the grid is ready for assembly in an array.

It will be clear that the invention is not limited to the exemplary embodiment described but various modifications are possible within the scope of the invention.

I claim:

1. Apparatus for providing a grid for use in collimating incident radiation, said apparatus comprising:

a plurality of laminations, each of which is relatively opaque to said radiation and has planar horizontally oriented top and bottom surfaces, all of said laminations being arranged in a spaced-apart vertically stacked configuration and oriented such that successive ones of the laminations have a pre-defined spacing therebetween, so as to define a plurality of spacings, with the planar surfaces of said laminations being horizontally parallel both to each other and to a direction of said incident radiation, a plurality of guides, each of which has a vertical length, distributed horizontally along a length of each of said laminations perpendicular to the direction of the incident radiation, wherein each of the guides longitudinally extends in a vertical direction perpendicular to both the planar surfaces of the laminations and to the incident radiation, a frame, affixed to top and bottom portions of said guides, and positionable and fixable to said guides along said perpendicular direction;

each of the guides having a plurality of reference faces formed therein distributed along the vertical length thereof wherein a predefined number of spacers are receivable between successive ones of the reference faces, each of said laminations being abuttingly situated between a different predefined corresponding pair of said spacers; and wherein the laminations and the spacings therebetween collectively form the grid.

2. The apparatus in claim 1 wherein each of said spacers is secured by a corresponding one of the guides in such a manner as to substantially prevent displacements of said each spacer in a direction parallel to the top and bottom surfaces of the laminations.

3. The apparatus in claim 2 wherein the spacers are stacked so as to define a plurality of successively occurring groups of spacers, each one of a first group of said spacers exhibiting a first spring constant and being secured in compression between two corresponding ones of a second group of said spacers, each of said second group of spacers exhibiting a second spring constant wherein said second spring constant is larger than the first spring constant.

4. The apparatus in claim 3 wherein two successive ones of the reference faces face each other so as to define a corresponding pair of said reference faces, said corresponding pair being one of a plurality of pairs of said reference faces located along said each guide, and wherein a different one of the second group of spacers is located between each corresponding pair of said reference faces.

5. The apparatus in claim 1 wherein each one of the spacers has a thickness corresponding to a desired pitch of the grid and a reduced thickness over a portion of said each one spacer so that, upon stacking of the spacers, an opening is formed between two successive ones of the spacers for slidably accommodating a corresponding one of the laminations.

6. The apparatus in claim 5 wherein said each one spacer is secured by a corresponding one of the guides in such a manner as to substantially prevent displacements of the spacer in a direction parallel to the top and bottom surfaces of the laminations.

7. The apparatus in claim 6 wherein the spacers are stacked so as to define a plurality of successively occurring groups of spacers, each one of a first group of said spacers exhibiting a first spring constant and being secured in compression between two corresponding ones of a second group of said spacers, each of said second group of spacers exhibiting a second spring constant wherein said second spring constant is larger than the first spring constant.

8. The apparatus in claim 7 wherein two successive ones of the reference faces face each other so as to define a corresponding pair of said reference faces, said corresponding pair being one of a plurality of pairs of said reference faces located along said each guide, and wherein a different one of the second group of spacers is located between each corresponding pair of said reference faces.

* * * * *